United States Patent [19]
Noumi et al.

[11] 3,829,668
[45] Aug. 13, 1974

[54] DOUBLE UNIT CONTROL DEVICE

[75] Inventors: Makoto Noumi; Susumu Seki, both of Kokubunji, Japan

[73] Assignee: Hitachi, Ltd., Tokyo, Japan

[22] Filed: Dec. 1, 1972

[21] Appl. No.: 311,143

[30] Foreign Application Priority Data
Dec. 2, 1971   Japan.............................. 46-97333
Dec. 2, 1971   Japan.............................. 46-97334
Dec. 2, 1971   Japan.............................. 46-97336

[52] U.S. Cl. ........................................ 235/153 AE
[51] Int. Cl. ...................... G06f 11/00, G06f 15/16
[58] Field of Search.... 235/153 AE, 153 AK, 150.2; 340/146.1 BE, 172.5

[56] References Cited
UNITED STATES PATENTS
3,474,412   10/1969   Rowley......................... 235/153 AE
3,476,922   11/1969   Yiotis........................... 235/153 AK
3,509,532   4/1970    Vane Wege................... 235/153 AE
3,517,171   6/1970    Avizienis....................... 236/153 AK
3,517,174   6/1970    Ossfeldt........................ 235/153 AE Primary Examiner—Charles E. Atkinson
Attorney, Agent, or Firm—Craig & Antonelli

[57]   ABSTRACT

In a double unit control device comprising a pair of information input units, a pair of arithmetical processing units and a pair of output units, each of the arithmetical processing units processes the input information from the corresponding input unit in accordance with a predetermined algorithm, exchanges during the process the intermediate processed result in the processing unit for that of the other processing unit so as to collate them with each other, has a self-diagnosing function diagnosing the fault in the corresponding output unit by obtaining the feedback signal from the output unit, and produces a signal for indicating a fault when the fault is detected.

3 Claims, 13 Drawing Figures

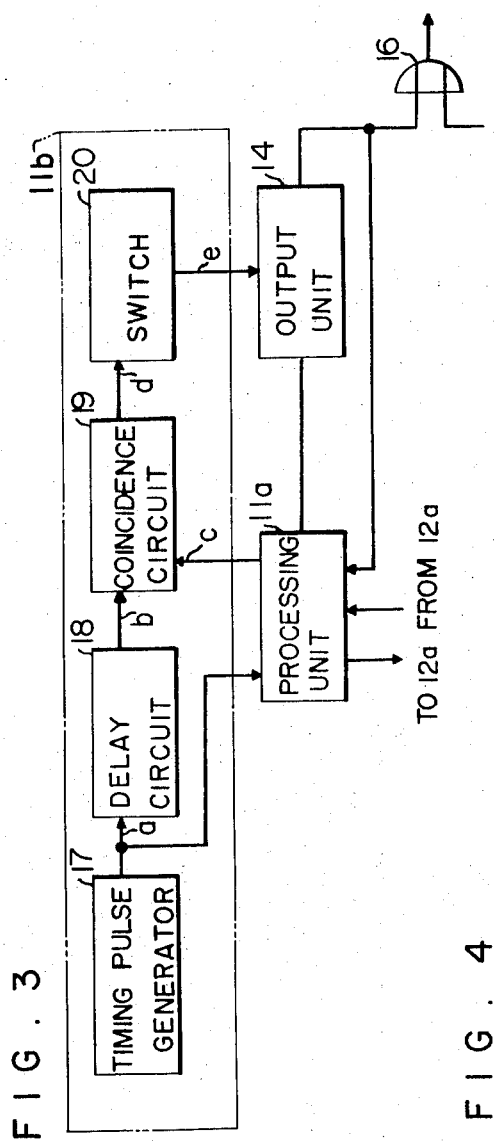
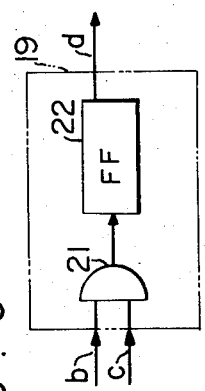
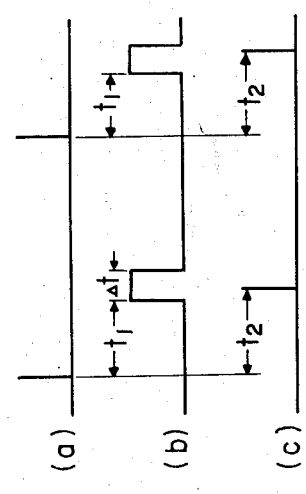
FIG. 3
FIG. 5
FIG. 4

DOUBLE UNIT CONTROL DEVICE

The present invention relates to a system for detecting errors which may occur in the control device performing on-line control of the controlled system.

A control device used for the automatic control of railroad traffic must have a high reliability since a railroad accident caused by a fault of the device would be apt to be fatal to passengers. Therefore, such a control device must be so designed as to perform a fail-safe operation, that is an operation by which a failure in the control device is prevented from causing a dangerous condition under any circumstances.

In order to achieve such a fail-safe function, a multiple unit control device comprising a plurality of parallel control units should be employed. And a prior art control device used in this field has its structure arranged in multiple system. Indeed, the multiple unit control device has a satisfactory reliability, but it suffers a disadvantage that it is of larger size and of more complicated structure with the result that its cost becomes higher and that it needs more space for installation. Moreover, with this control device, the structure of means for selecting the outputs of the multiple units to be sent to the controlled system, becomes complicated and this complexity is apt to adversely affect the overall reliability of the device.

It is, therefore, necessary to use a simplex control device having only one control unit or double unit control device consisting of two control units and to improve the reliability of the individual control unit so as to improve the overall reliability. The smaller is the number of individual control units, the easier is the detection of faults caused in the units. Accordingly, the means for selecting the output of the multiple units can be simplified so that the overall reliability will be improved.

One object of the present invention is to provide a fail-safe, double unit control device having a function of diagnosing faults.

Another object of the present invention is to provide a control device having a means for diagnosing the faults in an arithmetical processor in multiple stages.

An additional object of the present invention is to provide a double unit control device which can exhibit a satisfactory reliability even if it is operated in single unit drive.

A further object of the present invention is to provide a double unit control device which can enjoy a high reliability in spite of simple structure and low price.

This invention will be described in detail hereinafter with reference to the accompanying drawings, in which;

FIG. 3 shows in detail the block diagram of a circuit constituting a part of the control device shown in FIG. 1;

FIG. 4 shows waveforms useful for the explanation of the operation of the circuit shown in FIG. 3;

FIG. 5 shows in detail a part of the circuit shown in FIG. 3, forming a coincidence circuit;

Figure 1:
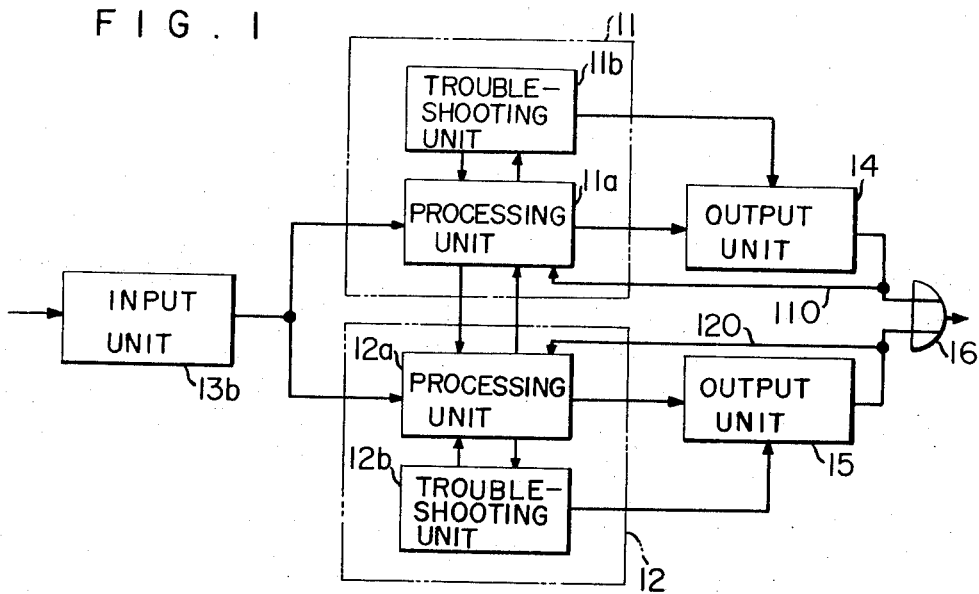
FIGS. 1 and 2 are the block diagrams of double unit control devices in their basic forms, according to the present invention.

Referring to FIG. 1 which shows, in block diagram, the basic circuit structure of one embodiment of the present invention, i.e. a double or dual unit control device, arithmetical processing units or computers $11a$ and $12a$ control the controlled system such as a train, an airplane an elevator, a chemical plant or the like in response to input signals. Trouble-shooting units $11b$ and $12b$ are provided to diagnose the faults occurring in the processing units $11a$ and $12a$, respectively. The trouble-shooting units $11b$ and $12b$ periodically check the processing units $11a$ and $12a$ and if there are faults in the processing units $11a$ and $12a$, the trouble-shooting-units $11b$ and $12b$ deliver signals indicative of the faults. In this circuit, the information of the processing unit $11a$ and that of the processing unit $12a$ can be interchanged with each other in response to the signals $a$ and $b$. Results which are not final obtained from the processing units, that is the results obtained during arithmetic operation are compared with others in this circuit. Namely, it is judged whether the difference between two results obtained in the course of arithmetical operation is confined within a predetermined tolerance of error, but not whether the two results are coincident with each other. If the difference is within the predetermined tolerance, it is judged by the processing units that at least one of the results is correct, thereafter, the successive arithmetical operations are performed in the processing units using the results as they are. For example, in case of controlling the braking action of a train in motion, one of several, say, ten predetermined grades of braking force has to be selected according to the condition of the train represented by the outputs obtained through arithmetical processing. If it is assumed that the results "three" and "two" are obtained respectively from the processing units $11a$ and $12a$ through such a processing, the circuit compares the two results with each other to obtain the difference between them. If the circuit is so designed that it may select the larger one of the two results when the difference is less than "two" which was previously assumed to be the tolerance, then the successive arithmetical operations are started with the results obtained by the processing units being "three", and such comparative operations are performed several times to reach the final result. If, however, it is detected after the information exchange that the difference between the two results is greater than the tolerance, then such a processing as recalculation for collation or programing check for making sure of the correctness of arithmetical operation, is initiated by the trouble shooting units. Output units 14 and 15 serve to transfer the information outputs processed by the processing units $11a$ and $12a$ to the controlled system and each is constituted of a relay and its drive circuit.

When the trouble-shooting units 11b and 12b judge that the final results are correct, these units supply suitable signals for the respective relay drive circuits so that the drive circuits actuate the relays to cause the processing units 11a and 12a to deliver the processed results. A gate 16 serves to take the logical sum of the outputs of the output units 14 and 15 and is constituted of, for example, the contacts of relays.

Figure 2:
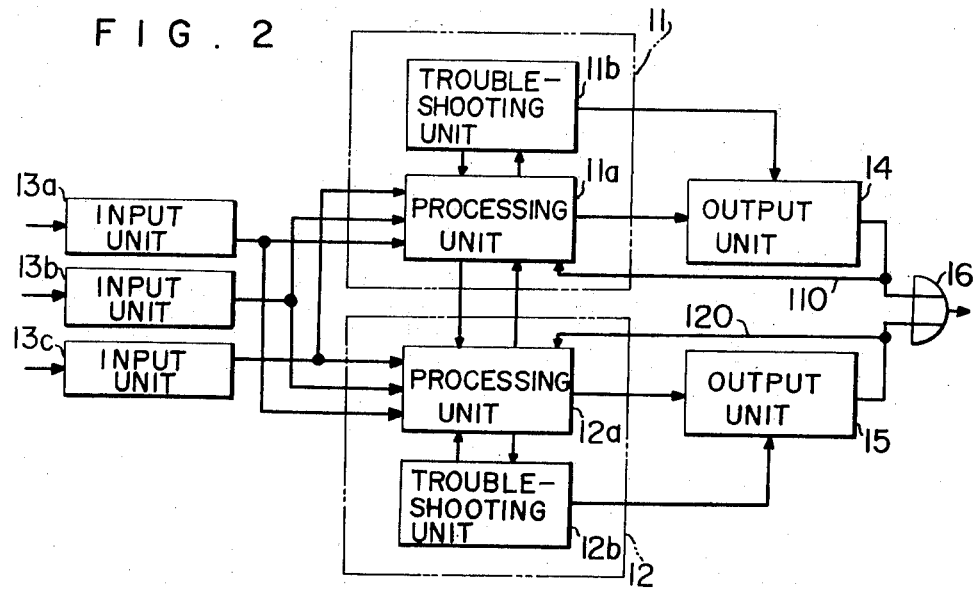

In case where the processing systems 11 and 12 having the structure described above are operating properly on the basis of their function of diagnosing faults, the input signals to the processing units 11a and 12a are to be coincident with each other at every moment. In fact, however, the timings of the input signals are apt to get out of phase with each other since each of the processing units operates independently, and it might happen that the signals are distorted before reaching the input terminals of the processing units 11a and 12a. It is possible in this case to judge which of the input signals is correct, by collating the input informations in the processing units 11a and 12a by the help of the signals a and b. It should here be noted that if the input unit 13b is of the simplex type the judgement may sometimes fail in the case where the input to the unit 13b is incorrect or blocked. In such a case, additional input units 13a and 13c may be provided to form a multiple unit input system, as shown in FIG. 2, so that the reliability of the input information may be improved. Moreover, with this circuit arrangement, the phase difference between plural input signals, which often occurs in case of a multiple unit system, can be corrected by selecting one of the plural input signals through the use of the above described means for exchanging informations on the basis of a reference common to all the units, and this process is simpler than the conventional method in which such a selection is performed at the output stage by means of relays. Further, by comparing the final results or the results during processing with each other through the use of the means for information exchange, errors which may occur in the processing units can be detected through the mutual exchange of informations so that reprocessing or the detailed diagnosis of the faults is performed or that the control device delivers a safety signal. In addition, a fault in the output unit 14 or 15 can be detected by judging whether the instructed signal output is being obtained if the outputs of the output units 14 and 15 are fed back respectively to the arithmetical processing units 11a and 12a through lines 110 and 120, as shown in FIG. 1. Therefore, any abnormal unit can be electrically detached from the overall system.

FIG. 3 is a block diagram illustrating the basic structure of the trouble-shooting unit 11b and FIG. 4 is a timing chart for the explanation of the operations of the parts of the trouble-shooting unit 11b. In the circuit of FIG. 3, a timing pulse generator 17 produces a pulse signal $a$ consisting of a series of timing pulses having a constant repetition rate. A delay circuit 18 retards the pulse signal $a$ by a constant time $t_1$ and thereafter generates a pulse signal $b$ having a pulse width of $\Delta t$. The timing relation between these pulse signals $a$ and $b$ is shown in FIG. 4. An arithmetical processing unit 11a performs a predetermined arithmetical operation to control the controlled system. The unit 11a has a common operation unit which operates in time-sharing fashion to control the system to be controlled. The processing unit 11a performs a predetermined operation through the ordinary operation of the common operation unit provided therein performed in response to the interruption of the pulse signal $a$. In this case, the predetermined arithmetical operation carried out by the processing unit 11a is so programmed that if a fault or an abnormal condition occurs in the processing units 11a the abnormality appears clearly in the processed result. Accordingly, when a series of operations is completed, the unit 11a judges whether the result is equal to a predetermined value. If the requirement is satisfied, a pulse signal $c$ is delivered from the unit 11a. If, in this case, the time $t_2$ required for the operation in question is controlled such that $t_1 < t_2 < t_1 + \Delta t$, as seen in FIG. 4, then it can be judged whether the processing unit 11a is properly operating according to whether the pulse $c$ lies within or without the duration of the pulse $b$. A circuit 19 serves to detect the coincidence of the pulse $b$ with the pulse $c$ and when there is a coincidence between them, the circuit 19 delivers a pulse signal $d$ as shown in FIG. 4 to actuate a switch 20 for safety and indication. The switch 20 not only indicates the fault in the processing unit 11a in response to the signal representing non-coincidence from the coincidence circuit 19, but also delivers a change-over signal $e$ to actuate the output unit 14 so that the processing unit 11a may deliver the output a safety side.

There are three cases where the pulse $b$ does not coincide in timing with the pulse $c$. One of them is where it is judged that there is an error in the processed result. Another is where a wrong processing time $t_2$ is obtained since a wrong operational route, i.e., wrong program, is followed, and the last one is where a wrong processing time $t_2$ is obtained since there is an abnormal condition in the delay circuit 18. In each case, the abnormality can be properly detected so that the fault can be detected.

Figure 6:
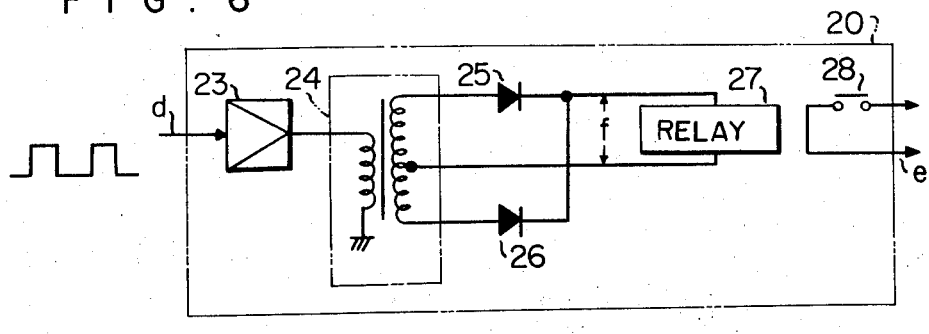
FIG. 6 shows in detail a part of the circuit shown in FIG. 3, forming a switching circuit for safety and indication.
Figure 7:
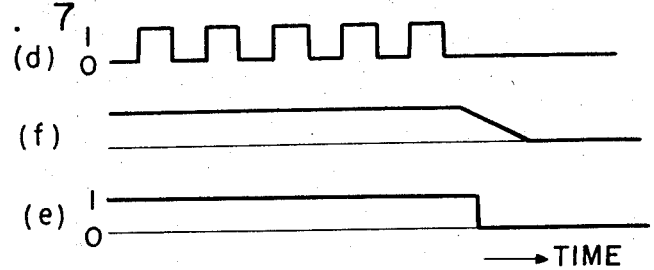
FIG. 7 shows waveforms useful for the explanation of the operation shown in FIG. 6.

The feature of the system described above is the provision of a means for detecting faults having a very simple structure. For the very simple structure, the means for detecting faults has an excellent reliability and therefore is especially adapted for use in such a control device as used in a train control which must detect a fault without fail and deliver a safety signal. However, this system can no longer assure the safety of the processing unit 11a if any one of the timing pulse generator 17, the delay circuit 18, the coincidence circuit 19 and the switch 20 for safety and indication is driven out of order. For the purpose of eliminating such an inconvenience, the coincidence circuit 19 is constituted of an AND gate 21 and a single-bit binary counter i.e., a flip-flop, 22. When the AND gate 21 detects the coincidence between the pulse signals $b$ and $c$, the gate 21 delivers an output which drives the flip-flop 22 to produce an ac signal $d$, as seen in FIG. 5. Now, if any one of the timing pulse generator 17, the delay circuit 18 and the coincidence circuit 19 is out of order, no ac output appears at the output terminal of the coincidence circuit 19. Therefore, if the switch 20 is so designed as to operate only when the input signal $d$ thereto is an ac one, then the safety signal can be produced by the switch 20. FIG. 6 shows an example of such a switch 20 for safety and indication which delivers an output $e$ representing a level "1" only when it receives an ac signal $d$. In FIG. 6, reference numeral 23 indicates an amplifier; 24 a transformer; 25 and 26 rectifiers; 27 a relay; and 28 contacts of the relay 27. FIG. 7 shows the change in amplitude of the output $e$ in the presence and absence of the ac output d. The waveform f is the output of the rectifiers 25 and 26.

When the ac signal d (shown in FIG. 7) from the coincidence circuit 19 is applied to the switch 20, the signal d is rectified by the rectifiers 25 and 26. Then, the rectified signal is applied to the relay drive circuit 27 to close the relay contacts 28. The relay contacts 28 are connected with a relay drive power source in the output unit 14. Accordingly, while the ac signal d is being applied to the switch 20, the relay in the output unit makes a circuit so that the processed result of the processing unit is obtained through the output unit 14.

Figure 8:
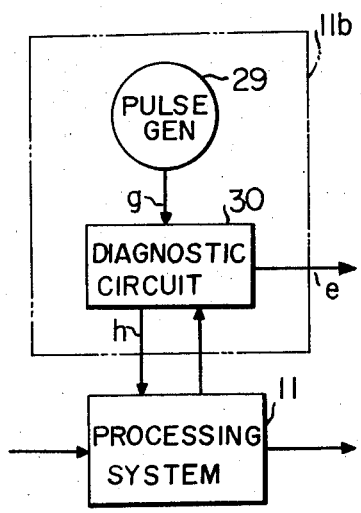
FIG. 8 shows a control device embodying the present invention.
Figure 9:
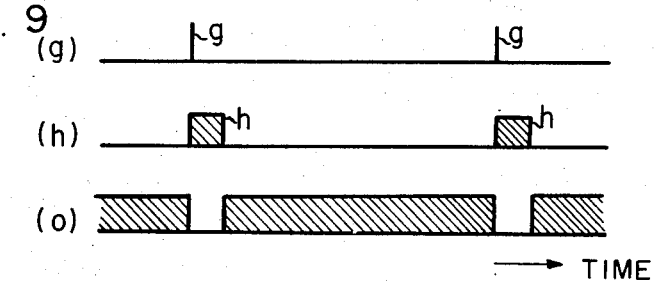
FIG. 9 shows waveforms useful for the explanation of the operation of the control device shown in FIG. 8.

FIG. 8 illustrates another embodiment of the present invention. In this figure, only one half of a double unit control device embodying the present invention is depicted. According to the present invention, this half part can be singly used and in such a case it can also attain a satisfactory reliability. In FIG. 8, the same reference characters are applied to like parts as in FIG. 1; an arithmetical processing unit is indicated at 11a and a trouble-shooting unit at 11b. A timing pulse generator is designated at 29. A diagnostic circuit 30 is started by a timing pulse 9 produced by the generator 29, generates a signal h and diagnoses whether there is a fault in the processing unit 11a. The processing unit 11a operates in the same manner as described above and controls the controlled system (not shown). FIG. 9 shows the waveforms of signals appearing at several points in the device shown in FIG. 8. The operation of the device will be described below by reference to FIG. 9. When a timing pulse g is generated by the pulse generator 29, the diagnostic circuit 30 is started by the timing pulse g to generate a signal h, and within the period of signal h, the diagnostic circuit 30 diagnoses the operational mechanism of the processing unit 11a. The diagram o shows the state of the operation of the processing unit 11a: the normal operation (represented by cross-hatched area) is interrupted during diagnosing process while the normal operation is resumed when the signal h vanishes to indicate that the normal condition is restored. When an abnormal condition is detected, the abnormality is indicated by the signal e delivered from the diagnostic circuit 30. The following operation of this device shown in FIG. 8 is the same as in the description made with FIG. 6.

Figure 10:
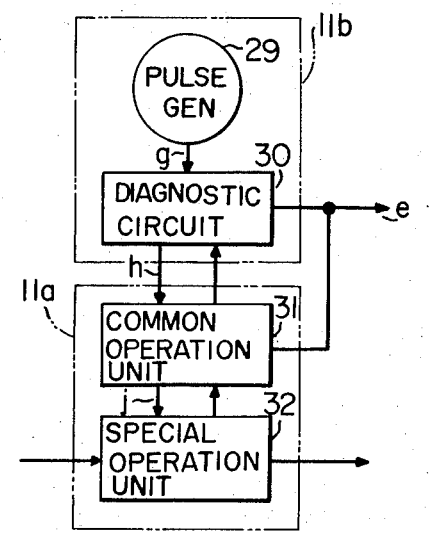
FIG. 10 shows in further detail the control device shown in FIG. 8.
Figure 11:
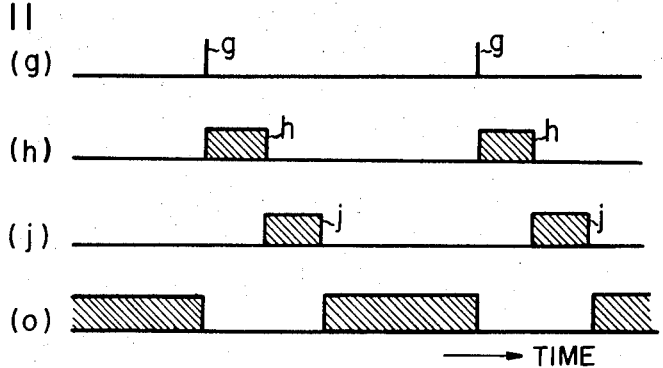
FIG. 11 shows waveforms useful for the explanation of the control device shown in FIG. 10.

FIG. 10 illustrates in further detail the device shown in FIG. 8, in which the processing unit 11a comprises two components 31 (e.g., common operation unit) and 32 (e.g., special operation unit). FIG. 11 is prepared for the explanation of the device shown in FIG. 10. When a timing pulse g is delivered from the generator 29, the diagnostic circuit 30 is first started to produce a signal h, which diagnoses the common operation unit 31. When it is judged that the unit 31 is in order, it delivers a signal j and within the period of signal j, the common operation unit 31 diagnoses the special operation unit 32 other than the common operation unit 31. Thereafter, the diagnosed area is increased and the diagnosing effect is extended to the parts other than the unit 32. If any one of the units 31 and 32 is out of order, the diagnosing circuit 30 or the common operation unit 31 delivers a signal e to indicate the fault. The diagram o of FIG. 11 shows the state of the operation of the processing unit 11a, in which it is seen that the normal operation (represented by the cross-hatched area) is interrupted during diagnosing process.

As described above, by employing a multi-stage diagnosing method there is obtained an advantage that the structure of the diagnostic circuit 30 is simplified and that the time required for detecting a fault is shortened.

Figure 12:
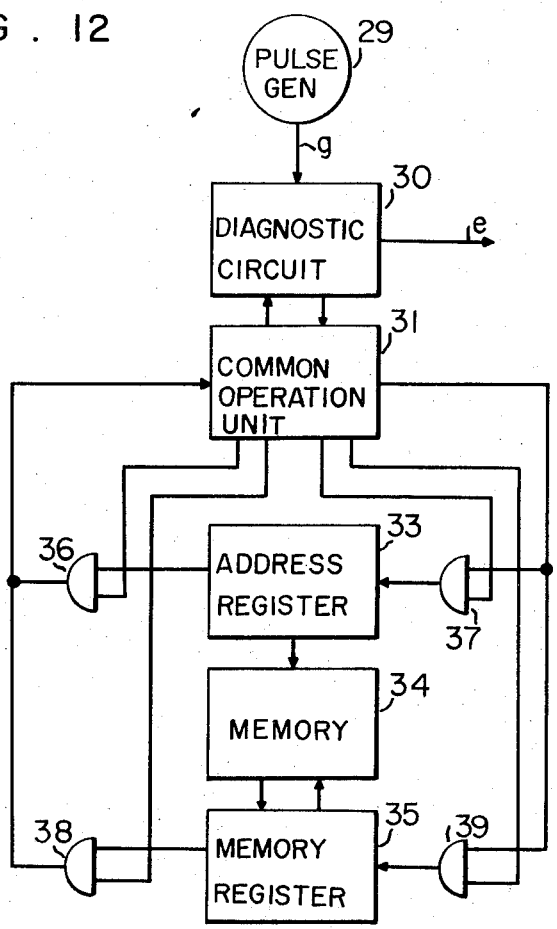
FIG. 12 shows in further detail the control device shown in FIG. 10.

FIG. 12 illustrates in further detail the arithmetical processing unit 11a used in a double unit control device embodying the present invention. In this figure are shown a timing pulse generator 29, a diagnostic circuit 30, a common operation circuit 31 similar to that as shown in FIG. 10, a memory 34, an address register 33 to specify the addresses of the memory 34, a memory register 35 to read and write the content of the memory 34, and gates 36, 37, 38 and 39 which are controlled by the common operation unit 31 to read the information out of the address register 33 and the memory register 35 or to write a new information into the registers 33 and 35. A program and associated data to control the controlled system are stored in the memory 34 and the common operation unit 31 reads the content of the memory 34 to perform the processing operation according to the instruction.

With this circuit arrangement, the diagnostic circuit 30 performs its proper function to diagnose the common operation unit 31 when a timing pulse is received by the circuit 30. If it is judged that the common operation unit 31 is in order, the initiative in control is passed to the common operation unit 31. Thereafter, the content of the memory 34 can be read in accordance with the diagnosing routine in the unit 31 and the diagnosis of the memory 34, the address register 33 and the memory register 35 are performed by, for example, making the total of the pieces of information read out of the memory 34.

Figure 13:
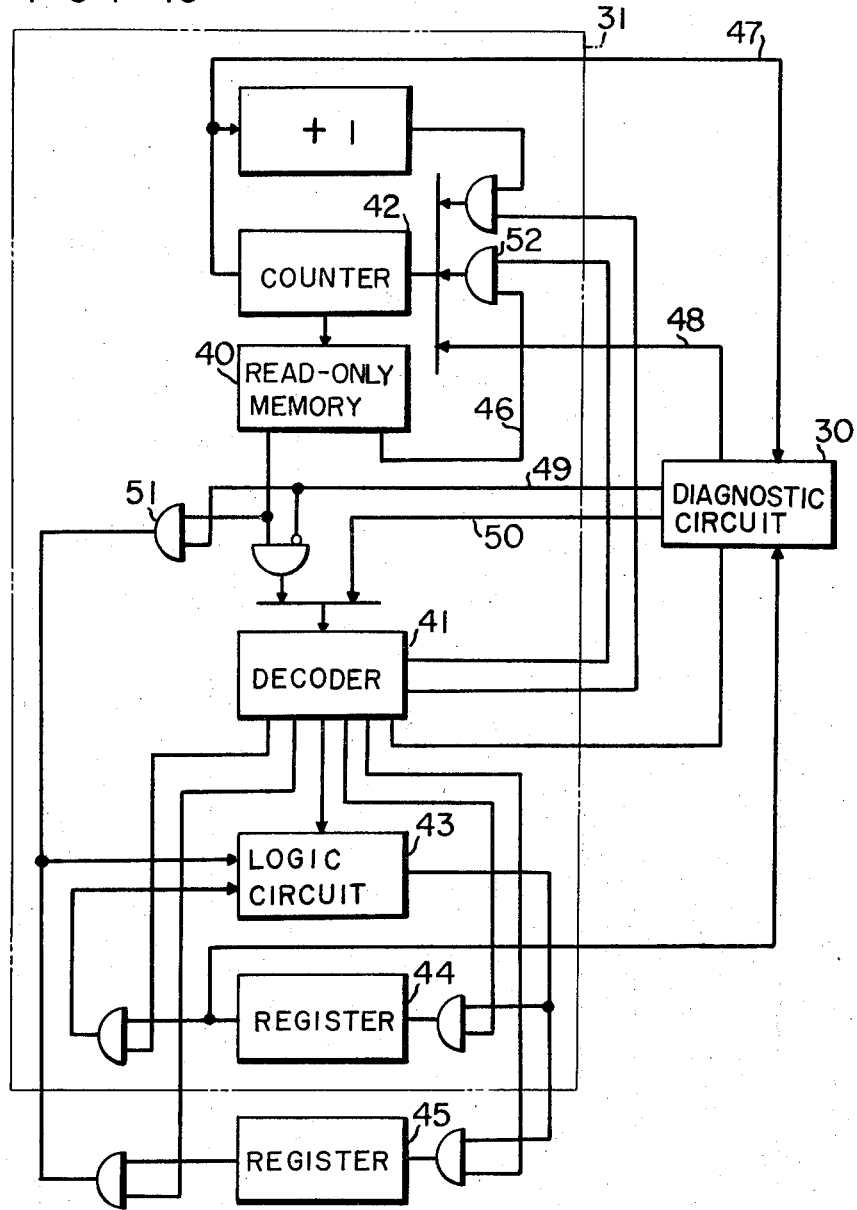
FIG. 13 shows in detail a part of the device shown in FIG. 12, forming a common operation unit.

FIG. 13 shows an example of the constitution of the common operation unit 31 shown in FIG. 12. In this figure, a read-only memory 40 stores therein a program for controlling the other components and performing operation through a decoder which decodes a given instruction to effect a necessary control. A counter 42 specifies the addresses to successively access the read-only memory 40 and is usually controlled by the output of the memory 40 through the decoder 41. Gates 51 and 52 play important roles for the control of the counter 42. A logic ciructt 43 performs an operation which is controlled by the output of the read-only memory 40 through the decoder 41. Registers 44 and 45 temporarily store the final processed results or the intermediate results during operation and also perform operations. In this embodiment, only two such registers are used, but it is easily understood by those skilled in the art that additional registers may be employed if need be. A diagnosing circuit 30 is started by an output 47 obtained in response to the output of the decoder 41 and the output 46 of the read-only memory 40, resets the counter 42 in response to a signal 48, detaches the output of the read-only memory 40 from the decoder 41, and causes the logic circuit 43 and the register 44 to perform adding operation through the gate 51 so that the result of the addition is accumulated. This operation of accumulation is instructed by the signal 50 delivered from the diagnosing circuit 30 through the decoder 41. In this way, each operating component performs its proper function in accordance with the signal 50 and it is detected by detecting the signal 47 representative of the value of the counter 42 that all the content of the read-only memory has been read out.

Thereafter, the diagnostic circuit 30 judges whether the register 44 contains a predetermined value or not and indicates whether there is a fault or not. Further, by storing in the read-only memory 40 a program for diagnosing other components such as the memory 34, the address register 33 and the memory register 35 shown in FIG. 12, the diagnosing effect can be extended over the entire device. Thus, according to the present invention, since the arithmetical processing unit can be used also as a diagnostic unit, there is obtained an advantage that the overall structure of the device is simplified and that the reliability of the device is much improved.

As described above, one of the most remarkable features of the present invention is that the fault of the device can be detected by means of a diagnostic unit having a very simple structure so that the reliability of the device is very high. Another is that the diagnosing effect can be further extended by means of the diagnosed operation unit. In this case, however, if there is caused a fault in the common operation unit 31 at the stage where the common operation unit 31 is diagnosing the special operation unit 32, then the following results obtained cannot be safe from errors. Therefore, by periodically triggering the diagnostic circuit 30 with the timing pulses from the timing pulse generator 29, the diagnostic procedure is always started with the diagnostic circuit 30 so that the fault in the common operation unit can be detected in the new procedure. Thus, the provision of such an interrupting means with timing pulses has proved very useful.

Further advantages of the present invention over the prior art system are as follows. Since a pair of systems, each including a processing unit which can diagnose the fault in itself, are combined to form a double unit control device, the overall structure of the device can be simplified and the selection of the final outputs of the indivudual systems is facilitated. Since each system has a self-diagnosing function, a satisfactory reliability can be attained even if only a half part of the device is used. And since the outputs of the input units are synchronized to produce a reference signal by exchanging the informations with each other and then by selecting one of the outputs, the selection operation is much simpler than in a conventional multiple unit control device even in case where the summed results are represented by a plurality of codes as in control of braking action described above.

What is claimed is:

1. A mobile object control device of the dual type comprising at least one input unit for receiving signals and providing an output indicative thereof, first and second computer processing unit means connected with each other for exchanging information therein with each other for the purpose of collation, said first and second computer processing unit means each being connected to said input unit for producing a signal for controlling a mobile object in response to the output received from said input unit, first and second trouble-shooting unit means connected respectively to said first and second computer processing unit means for diagnosing faults in the object control device, each of said trouble-shooting unit means providing an error signal for indicating a fault in response to the detection of a fault by said trouble-shooting unit means, first and second output units connected respectively to said first and second computer processing unit means and to said first and second trouble-shooting means, each of said output units providing an output signal in accordance with the output of the associated computer processing unit means and including a relay switch for interrupting the output signal of said computer processing unit means in response to the error signal from said trouble-shooting unit means, first and second feedback lines connected respectively between said first output unit and said first computer processing unit means and between said second output unit and said second computer processing unit means, said first and second trouble-shooting unit means diagnosing faults in the associated output unit by detecting the feedback signal from the output unit to the computer processing unit means, and means connected to said output units for providing the logical sum of the outputs of said output units as a control signal.

2. A mobile object control device according to claim 1, wherein each of said trouble-shooting unit means includes a timing pulse generator for producing a pulse signal of a constant period, a delay circuit connected to said timing pulse generator for delaying said pulse signal, a coincidence circuit for comparing a signal from said computer processing unit means associated with said trouble-shooting unit means with the delayed pulse signal from said delay circuit and providing a signal in accordance with the result of the comparison, and a switch operative in response to a noncoincidence signal from said coincidence circuit for controlling said output unit associated therewith, each of said computer processing unit means including a common operation unit means operating in time sharing relation in synchronization with the pulse signal from said timing pulse generator and providing an output pulse when the result of a computing operation coincides with a predetermined value for such operation.

3. A mobile object control device according to claim 1, wherein each of said trouble-shooting means includes a timing pulse generator for producing a pulse signal of a constant period, and a diagnostic circuit operating in synchronization with the pulse signal from said timing pulse generator for diagnosing the existence of a fault in said computer processing unit means associated therewith, each of said computer processing unit means including a common operation unit means operating in time sharing relation in synchronization with the timing pulse, the operation of said common operation unit means being interrupted during the diagnosis operation, and said common operation unit means diagnosing the remaining part of said computer processing unit means after said common operation unit means has been proved to be operating properly.

* * * * *